(12) United States Patent
Matsuo et al.

(10) Patent No.: US 9,445,012 B2
(45) Date of Patent: Sep. 13, 2016

(54) CAMERA CONTROLLER DEVICE

(71) Applicant: PANASONIC CORPORATION, Osaka (JP)

(72) Inventors: Akane Matsuo, Osaka (JP); Keiya Eguchi, Osaka (JP); Takashi Komemushi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 14/203,076

(22) Filed: Mar. 10, 2014

(65) Prior Publication Data

US 2014/0267814 A1 Sep. 18, 2014

(30) Foreign Application Priority Data

Mar. 15, 2013 (JP) ................... 2013-052849
Feb. 17, 2014 (JP) ................... 2014-027171

(51) Int. Cl.
*H04N 5/247* (2006.01)
*H04N 5/232* (2006.01)
*G08B 13/196* (2006.01)

(52) U.S. Cl.
CPC ............ *H04N 5/247* (2013.01); *G08B 13/196* (2013.01); *H04N 5/232* (2013.01)

(58) Field of Classification Search
USPC ......... 348/207.1, 207.11, 211.1–211.11, 143, 348/159; 396/322–325, 329–340
See application file for complete search history.

(56) References Cited

U.S. PATENT DOCUMENTS

| | | | |
|---|---|---|---|
| 5,479,206 A | 12/1995 | Ueno et al. | |
| 6,750,913 B1* | 6/2004 | Noro | H04N 5/232 348/207.11 |
| 2004/0150728 A1* | 8/2004 | Ogino | G06T 7/0022 348/239 |
| 2010/0321495 A1* | 12/2010 | Oya | H04N 5/23203 348/143 |

FOREIGN PATENT DOCUMENTS

| | | |
|---|---|---|
| JP | 05-219429 A | 8/1993 |
| JP | 2002-369068 A | 12/2002 |

* cited by examiner

*Primary Examiner* — Mark Monk
(74) *Attorney, Agent, or Firm* — McDermott Will & Emery LLP

(57) ABSTRACT

A camera controller device of the present technique includes a switching operation unit for switching a camera to be controlled, an adjuster for adjusting adjustment elements of a camera to be controlled, and a controller for controlling the entire device. The adjuster has a start point and an end point of an adjustment range. The controller compares a setting value of the adjustment element of the camera before switching with a setting value of the adjustment element of the camera after switching, and when both the setting values do not match with each other, the controller prohibits an operation of the cameras until the setting value of the adjustment element of the camera after switching matches with a setting value set by the adjuster.

5 Claims, 14 Drawing Sheets

CAMERA CONTROLLER DEVICE

RELATED APPLICATIONS

This application claims the benefit of Japanese Application No. 2013-052849, filed on Mar. 15, 2013 and Japanese Application No. 2014-027171, filed on Feb. 17, 2014, the disclosures of which Applications are incorporated by reference herein.

BACKGROUND OF THE INVENTION

1. Field of the Invention

The present technique relates to a camera controller device that switches a plurality of cameras to enable control.

2. Description of the Related Art

A camera controller device connects a plurality of cameras via an internet or a connection cable, and controls iris adjustment and gain adjustment of each of the cameras.

Unexamined Japanese Patent Publication No. 2002-369068 discloses a camera system composed of a plurality of cameras and a camera controller. The controller of the camera system uses a rotary encoder in order to set photographing conditions of cameras and displays setting values of the encoder on a display device.

SUMMARY OF THE INVENTION

A camera controller device of the present technique includes a switching operation unit for switching a camera to be controlled between a plurality of cameras, an adjuster for adjusting an adjustment element of the camera to be controlled, and a controller for controlling the entire device. The adjuster has a start point and an end point of an adjustment range. The controller compares a setting value of the adjustment element of the camera before switching with a setting value of the adjustment element of the camera after switching, and when both the setting values do not match with each other, the controller prohibits an operation of the cameras until the setting value of the adjustment element of the camera after switching matches with a setting value set by the adjuster.

DETAILED DESCRIPTION OF THE PREFERRED EMBODIMENTS

A camera controller device according to one embodiment of the present technique is described below with reference to the drawings. However, description that is more than necessary is occasionally omitted. For example, detailed description about well-known terms and overlapped description about substantially identical constitution are occasionally omitted. This is for avoiding the following description from being unnecessarily redundant and providing easy understanding to people skilled in the art.

The inventors provide the accompanying drawings and the following description for the easy understanding of the people skilled in the art, and do not intend to limit a main subject described in claims due to the drawings and the description.

Figure 1:
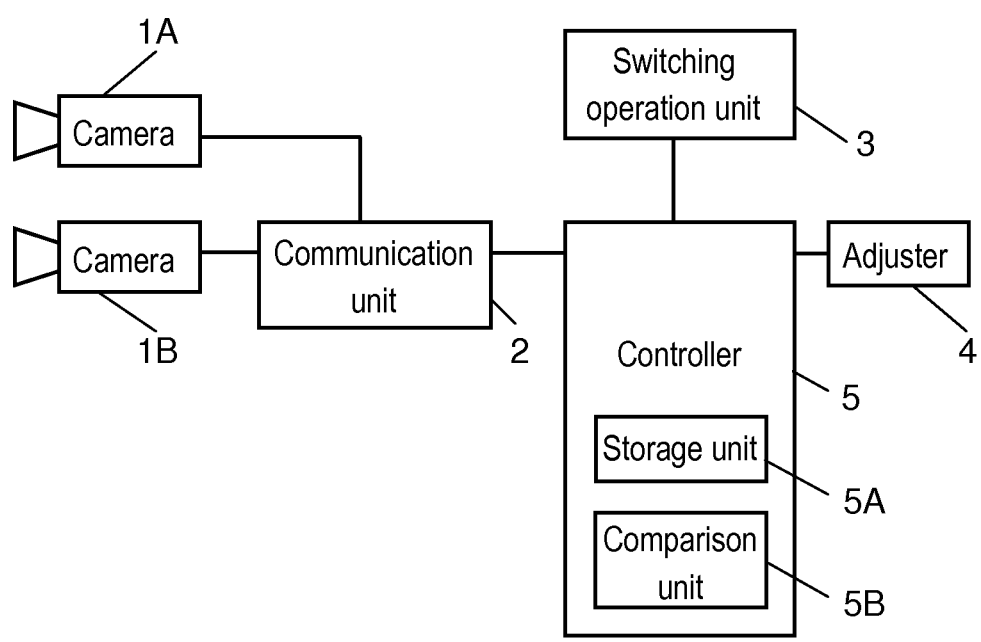
FIG. 1 is a block diagram illustrating a constitution of a main body part of a camera controller device according to one embodiment of the present technique.

FIG. 1 is a block diagram illustrating a constitution of the main body part of the camera controller device according to one embodiment of the present technique.

As shown in FIG. 1, communication unit 2, switching operation unit 3, adjuster 4, and controller 5 are provided. Communication unit 2 is connected to first camera 1A and second camera 1B as a plurality of cameras to be controlled by using a cable or a radio wave. Switching operation unit 3 switches a camera to be controlled among the plurality of cameras. Adjuster 4 adjusts adjustment elements of photographing conditions such as iris adjustment, pedestal adjustment, gain adjustment and flare adjustment of the camera to be controlled. Controller 5 controls the entire device.

Communication unit 2 is connected to the plurality of first camera 1A and second camera 1B via a connection cable so as to be capable of transmitting/receiving signals. As this connecting method, IP connection for connecting using an internet communication network via a switching hub, and a connection by serial communication for connecting devices directly via a connection cable can be used. Naturally, a connecting method for wireless connection using a wireless LAN may be used.

Switching operation unit 3 is switching means for selecting a camera to be controlled from the plurality of first camera 1A and second camera 1B. When switching operation unit 3 is operated, information representing that the camera to be controlled is switched is transmitted to controller 5.

Adjuster 4 has a slide type volume or rotary volume using a variable resistor. Adjuster 4 has volumes whose number accords with the adjustment elements such as the iris adjustment, the pedestal adjustment, the gain adjustment and the flare adjustment.

Figure 2:
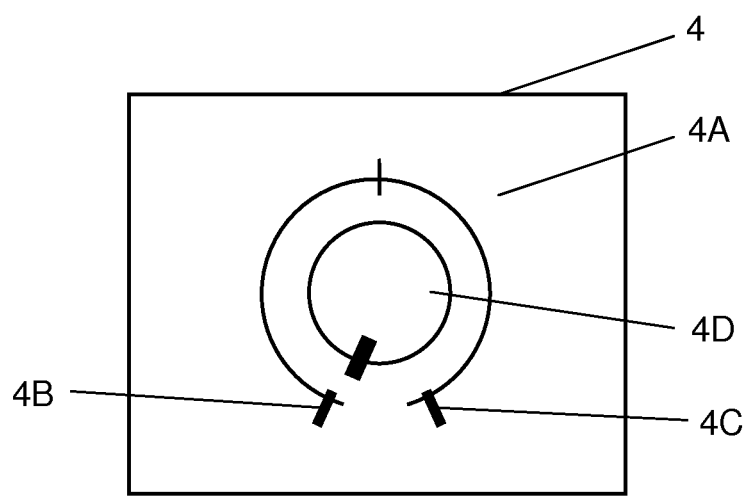
FIG. 2 is an explanatory diagram illustrating a schematic constitution of a rotary volume as one example of an adjuster in the camera controller device according to the present embodiment.

FIG. 2 is an explanatory diagram illustrating a schematic constitution of the rotary volume as one example of the adjuster in the camera controller device according to one embodiment of the present technique. As shown in FIG. 2, rotary volume 4A composing adjuster 4 has start point 4B and end point 4C of an adjustment range, and adjuster 4 can be adjusted between start point 4B and end point 4C. Adjuster 4 has operation unit 4D. An adjustment value obtained by adjuster 4 can be visible to the naked eye based on position information within adjustable range represented by operation unit 4D.

In the example shown in FIG. 2, an analog signal according to a change in a resistance value is output from volume 4A. Adjuster 4, however, has an AD converter for AD-converting the analog signal, and thus a digital signal is output from adjuster 4. Naturally, an analog signal is output from adjuster 4, and controller 5 may be provided with the AD converter for converting an analog signal into a digital signal. The AD converter may be separately provided between adjuster 4 and controller 5. Further, adjuster 4 may be constituted by using a rotary encoder where the adjustable range is defined by setting start point 4B and end point 4C instead of volumes. In this case, the encoder can output position information as a digital signal.

Controller 5 is composed of a semiconductor device having a central processing unit such as a microcomputer. Controller 5 selects the camera to be controlled from the plurality of first camera 1A and second camera 1B based on the information transmitted from switching operation unit 3, and transmits a control signal of selection information of the camera to communication unit 2. Further, controller 5 receives setting values of the adjustment elements such as iris adjustment, pedestal adjustment, gain adjustment and flare adjustment set by adjuster 4, and controls communication unit 2 so that the setting values are transmitted to the camera to be controlled selected via communication unit 2.

Further, controller 5 includes storage unit 5A and comparison unit 5B. Storage unit 5A stores the setting values of the adjustment elements such as an iris adjustment value, a pedestal adjustment value, a gain adjustment value and a flare adjustment value adjusted by adjuster 4 for the plurality of first camera 1A and second camera 1B. Comparison unit 5B compares the setting values of the adjustment elements of the respective cameras with each other.

Controller 5 controls communication unit 2, requests the selected camera to be controlled to transmit the setting values such as the iris adjustment value, the pedestal adjustment value, the gain adjustment value and the flare adjustment value, and receives the setting values of the adjustment elements of the camera to be controlled after switching. Controller 5 reads the setting values of the adjustment elements of the camera before switching from storage unit 5A. Comparison unit 5B compares the read setting values with the received setting values of the adjustment elements of the camera after switching. When comparison unit 5B compares the setting values of both the cameras and both the setting values do not match with each other, controller 5 controls communication unit 2 so that the setting values are not transmitted to the camera to be controlled after switching until the values of the camera after switching received via communication unit 2 match with the setting values of the adjustment elements from adjuster 4 even when receiving the setting values of the adjustment elements from adjuster 4. That is to say, operation unit 4D of adjuster 4 is in an operation prohibiting state, an "idle state", until the setting values of the adjustment elements of the camera after switching received via communication unit 2 match with the setting values set by adjuster 4.

Further, storage unit 5A of controller 5 stores the setting values of the camera to be controlled received from adjuster 4. The storage in storage unit 5A of controller 5 is performed at the timing, for example, when switching operation unit 3 selects the camera to be controlled. At this time, when the setting values of the camera to be controlled are already written into storage unit 5A, controller 5 controls storage unit 5A so that the setting values in storage unit 5A are overwritten by setting values newly received.

An operation for switching the camera in the camera controller device according to one embodiment of the present technique is described below.

Figure 3:
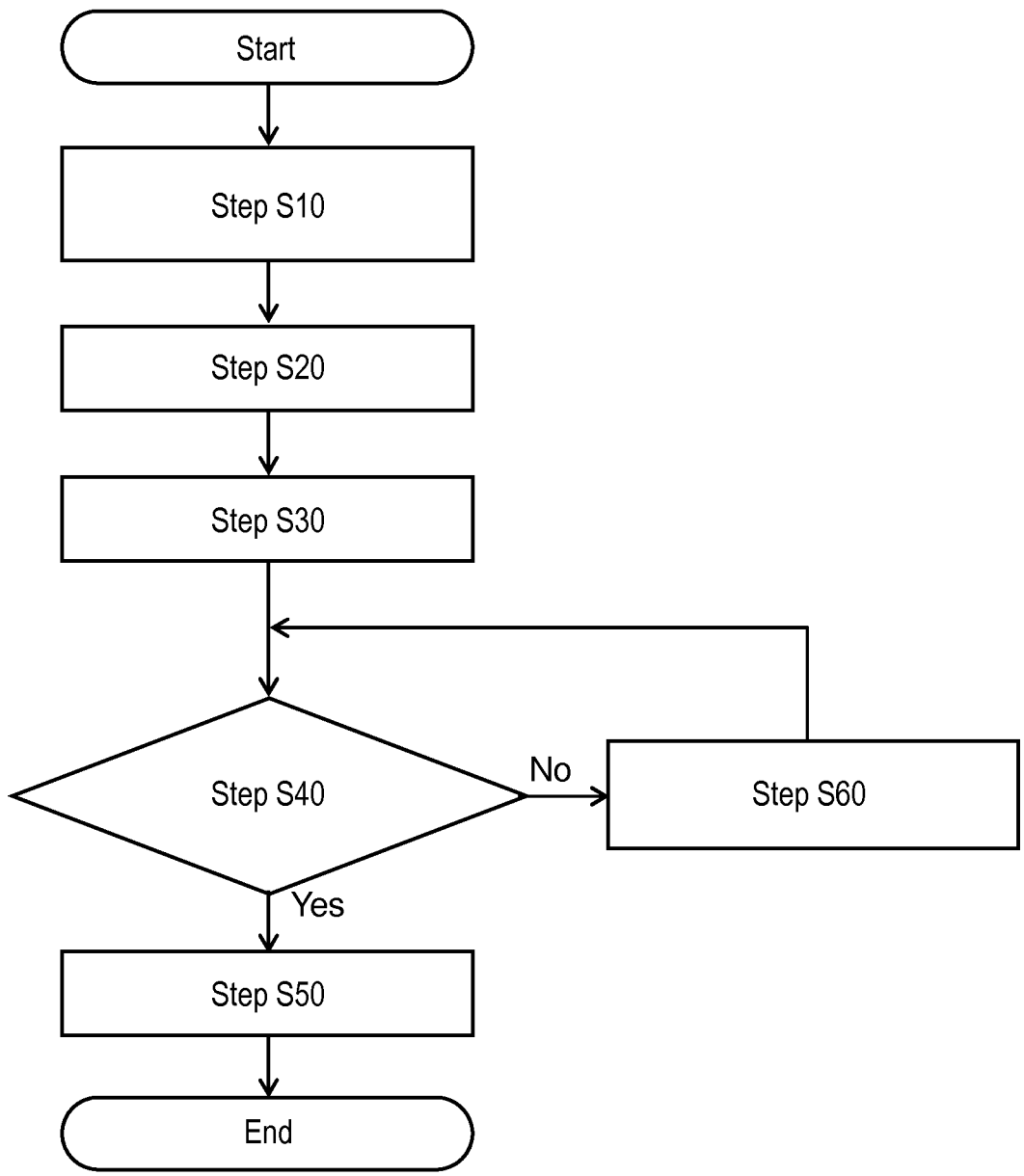
FIG. 3 is a flowchart illustrating an operation for switching the camera in the camera controller device according to the present embodiment.

FIG. 3 is a flowchart illustrating the operation for switching the camera in the camera controller device according to one embodiment of the present technique.

When an operator operates switching operation unit 3 so as to switch first camera 1A to second camera 1B (step S10), controller 5 sets a control target from first camera 1A to second camera 1B, and transmits a control signal for switching to communication unit 2.

When communication unit 2 requests second camera 1B to transmit the setting values of second camera 1B to the main body part of the device according to the control signal from controller 5, second camera 1B receives the transmission request from the main body part of the device and transmits the setting values of second camera 1B to the main body part of the device at step S20. Communication unit 2 of the main body part of the device receives the setting values of second camera 1B, and retains them in controller 5 at step S30.

Comparison unit 5B compares the received setting values of second camera 1B with the setting values of first camera 1A stored in storage unit 5A, and controller 5 determines whether they match with each other at step S40. The setting values of first camera 1A stored in storage unit 5A are the setting values of first camera 1A to be controlled that are received from adjuster 4 before switching. That is to say, position information about operation unit 4D of adjuster 4 before switching is stored in storage unit 5A.

When the setting values match with each other (Yes), the sequence proceeds to next step S50. When controller 5 operates operation unit 4D of adjuster 4 for the adjustment elements such as the iris adjustment, the pedestal adjustment, the gain adjustment and the flare adjustment, the setting values adjusted by operation unit 4D are transmitted to second camera 1B at step S50.

On the other hand, when they do not match (No), the sequence proceeds to next step S60. At step S60, even when operation unit 4D of adjuster 4 is operated for the adjustment elements such as the iris adjustment, the pedestal adjustment, the gain adjustment and the flare adjustment, controller 5 provides the operation prohibited state, "the idle state", where the setting values adjusted by operation unit 4D are not transmitted to second camera 1B, and repeats the operation at step S40. That is to say, operation unit 4D of adjuster 4 is in the operation prohibited state, "the idle state", until the setting values of the adjustment elements of second camera 1B after switching that are received via communication unit 2 match with the setting values set by adjuster 4.

Figure 4:
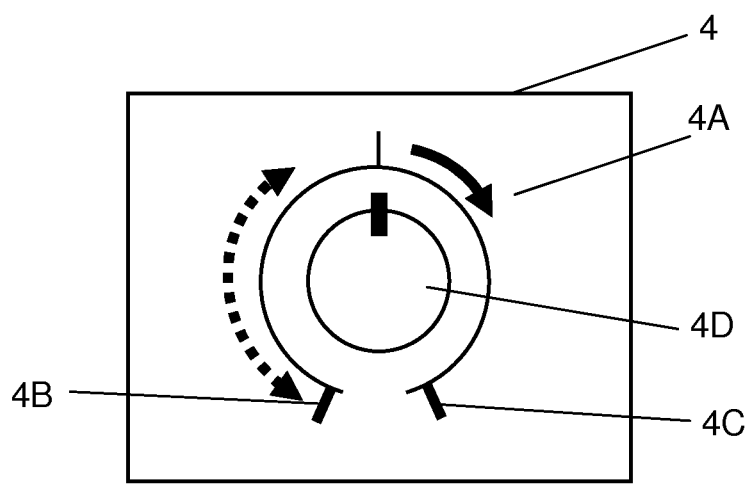
FIG. 4 is an explanatory diagram illustrating an operation of the adjuster for switching the camera in the camera controller device of the present technique.

FIG. 4 is an explanatory diagram illustrating an operation of the adjuster for switching the camera in the camera controller device of the present technique.

When first camera 1A is switched to second camera 1B, even if operation unit 4D of adjuster 4 is operated, the setting values are not transmitted to second camera 1B until the setting values of first camera 1A match with the setting values of second camera 1B. That is to say, operation unit 4D of adjuster 4 is in the operation prohibited state, the "idle state". A range indicated by a dotted line in FIG. 4 is the range of the "idle state".

After a time point when operation unit 4D of adjuster 4 is operated and the setting values of first camera 1A and second camera 1B match with each other, communication of the setting values set in second camera 1B by adjuster 4 is started. A portion indicated by a solid line in FIG. 4 is a position of operation unit 4D where the communication of the setting values set by adjuster 4 is started.

The camera controller device of the present technique includes switching operation unit 3, adjuster 4, and controller 5. Switching operation unit 3 switches the camera to be controlled between the plurality of cameras. Adjuster 4 adjusts the adjustment elements of the camera to be controlled. Controller 5 controls the entire device. Further, adjuster 4 has the start point and the end point of the adjustment range. Further, controller 5 compares the setting values of the adjustment elements of the camera before switching with the setting values of the adjustment elements of the camera after switching. When the setting values of both the cameras do not match with each other, controller 5 prohibits the operation until the setting values of the adjustment elements of the camera after switching match with the setting values set by the adjuster.

As a result, when the operator operates adjuster 4 after switching the camera, adjuster 4 is brought into the operation prohibited state until the setting values of second camera 1B are set, so that the setting values of second camera 1B can be synchronized with the operation values of the main body part of the device. Further, since the operator can visually recognize the position of the operating unit of adjuster 4 due to the presence of the start point and the end point, the controller device of the present technique easily recognizes a change amount and can perform a sensuous operation. As a result, a display device of the camera controller device can be eliminated, and the cost and the size of the device can be reduced.

Another embodiment of the present technique is described below.

Figure 5:
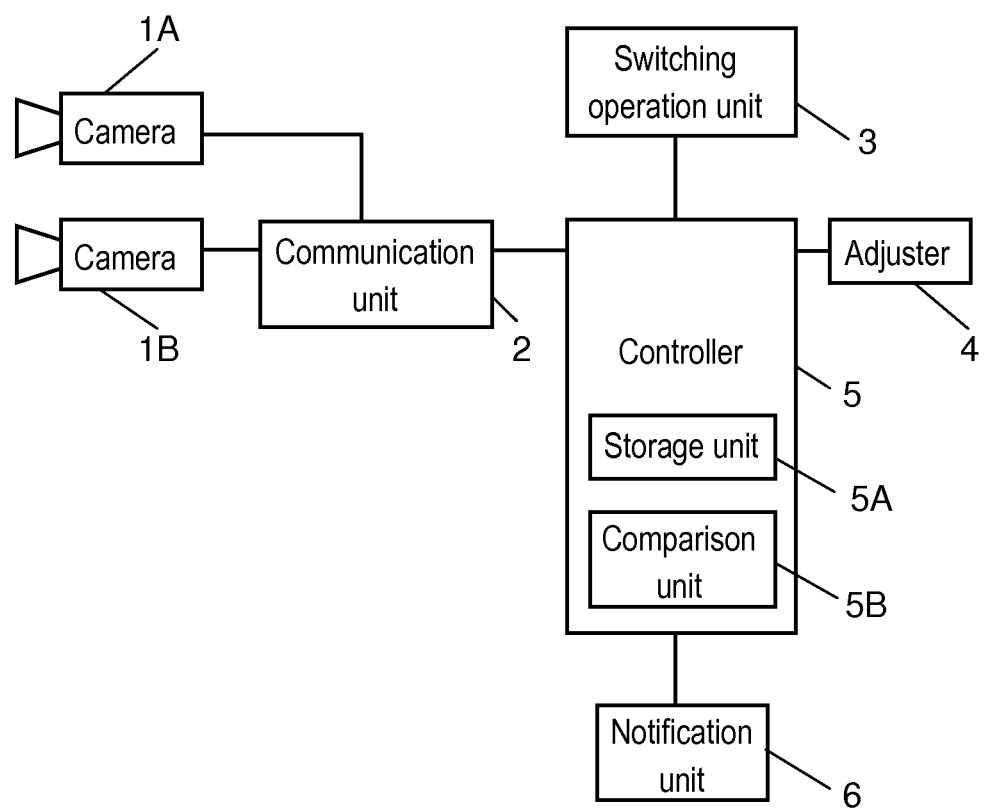
FIG. 5 is a block diagram illustrating a constitution of the main body part of the camera controller device according to another embodiment of the present technique.
Figure 6:
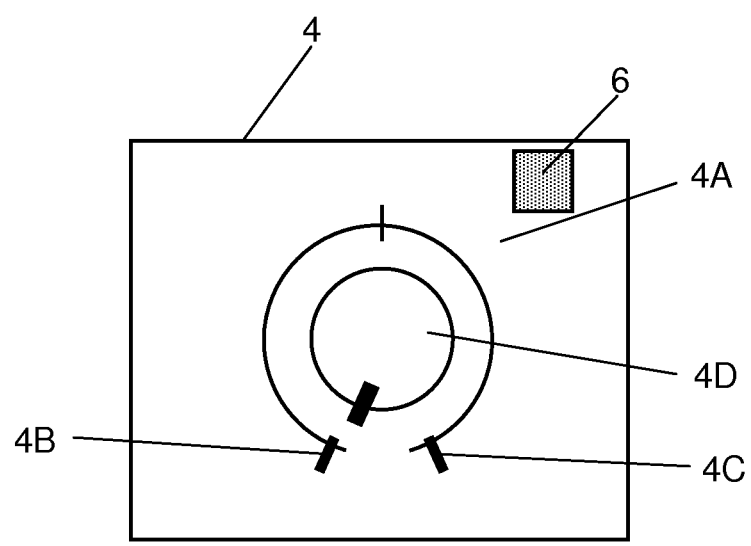
FIG. 6 is an explanatory diagram illustrating a schematic constitution as one example of the adjuster in the camera controller device according to the present embodiment.
Figure 7:
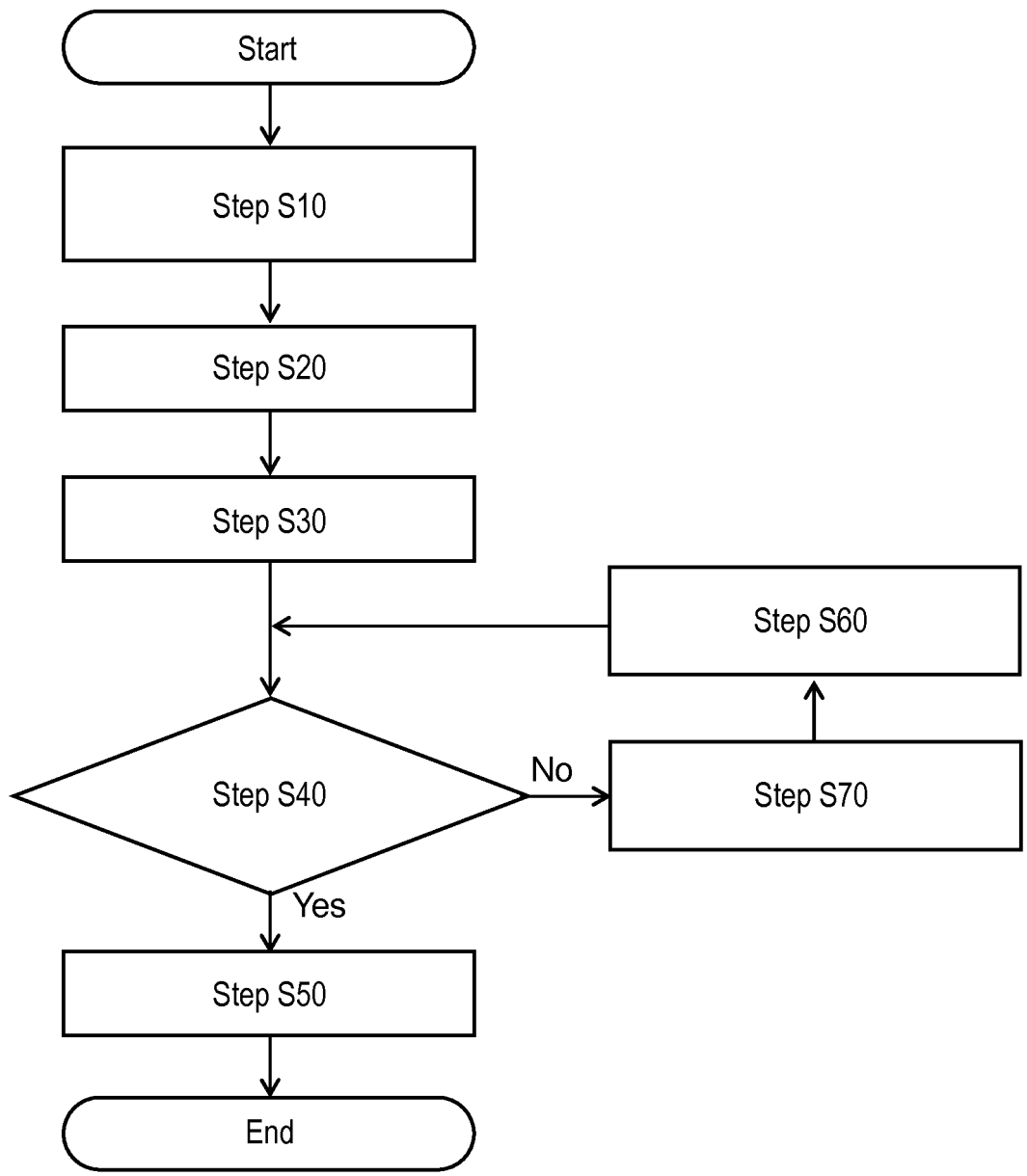
FIG. 7 is a flowchart illustrating an operation for switching the camera in the camera controller device according to the present embodiment.

FIG. 5 is a block diagram illustrating a constitution of the main body part of the camera controller device according to another embodiment of the present technique. FIG. 6 is an explanatory diagram illustrating a schematic constitution of one example of the adjuster in the camera controller device according to the present embodiment. FIG. 7 is a flowchart illustrating an operation for switching the camera in the camera controller device according to the present embodiment. In FIG. 5, FIG. 6 and FIG. 7, portions having the same functions as those of the portions shown in FIG. 1, FIG. 2 and FIG. 3 are denoted by the same reference symbols.

As shown in FIG. 5 and FIG. 6, the camera controller device according to the present embodiment includes notification unit 6 in addition to communication unit 2, switching operation unit 3, adjuster 4 and controller 5. Notification unit 6 is composed of an LED or a buzzer, and notifies the operator about a present state of the main body part of the device.

Notification unit 6 gives a notification to the operator in a case where when controller 5 reads the setting values of the adjustment elements of the camera before switching from storage unit 5A and comparison unit 5B compares the setting values with the received setting values of the adjustment elements of the camera after switching, the setting values of both the cameras do not match with each other.

As shown in FIG. 7, comparison unit 5B compares the received setting values of second camera 1B with the setting values of first camera 1A stored in storage unit 5A, controller 5 determines whether both the values match with each other at step S40. When they match with each other (Yes), the sequence proceeds to next step S50. When controller 5 operates operation unit 4D of adjuster 4 for the adjustment elements such as the iris adjustment, the pedestal adjustment, the gain adjustment and the flare adjustment, the setting values adjusted by operation unit 4D are transmitted to second camera 1B at step S50.

On the other hand, when they do not match (No), the sequence proceeds to next step S70, notification unit 6 notifies the operator about non-matching. At the same time, at step S60, even when operation unit 4D of adjuster 4 is operated for the adjustment elements such as the iris adjustment, the pedestal adjustment, the gain adjustment and the flare adjustment, controller 5 provides the operation prohibited state, the "idle state", where the setting values adjusted by operation unit 4D are not transmitted to second camera 1B, and repeats the operation at step S40. That is to say, notification unit 6 notifies the operator about non-matching until the setting values of second camera 1B after switching received via communication unit 2 match with the setting values set by adjuster 4, and operation unit 4D of adjuster 4 is in the operation prohibited state, the "idle state".

In the present embodiment, when the camera is switched, the operator is notified that the setting values of the adjustment elements such as the iris adjustment, the pedestal adjustment, the gain adjustment, and flare adjustment of the camera before switching and the camera after switching do not match with each other. As a result, when the camera is switched, the operator can easily recognize that the setting values of both the cameras are different from each other.

Figure 8:
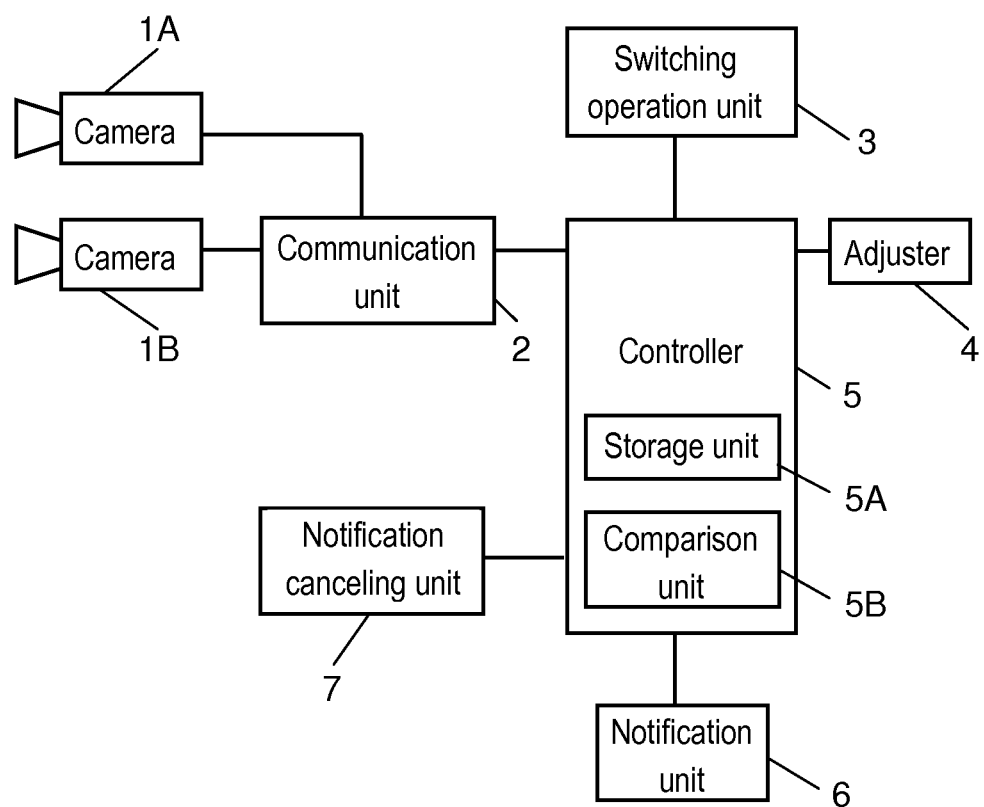
FIG. 8 is a block diagram illustrating a constitution of the main body part of the camera controller device according to another embodiment of the present technique.
Figure 9:
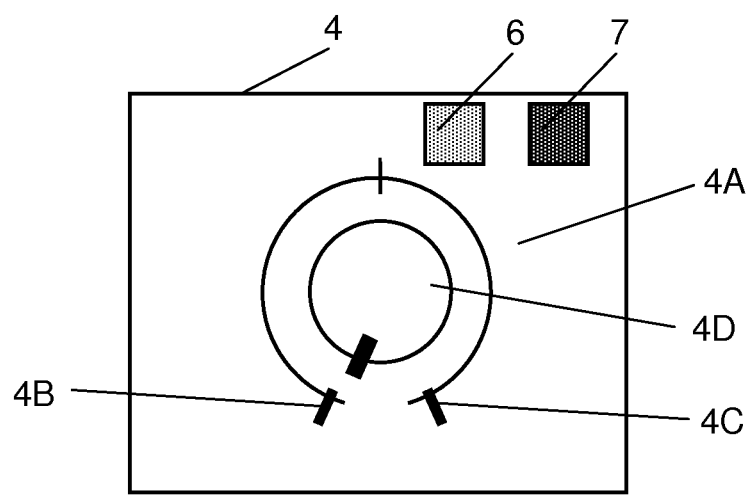
FIG. 9 is an explanatory diagram illustrating a schematic constitution of one example of the adjuster in the camera controller device according to the present embodiment.
Figure 10:
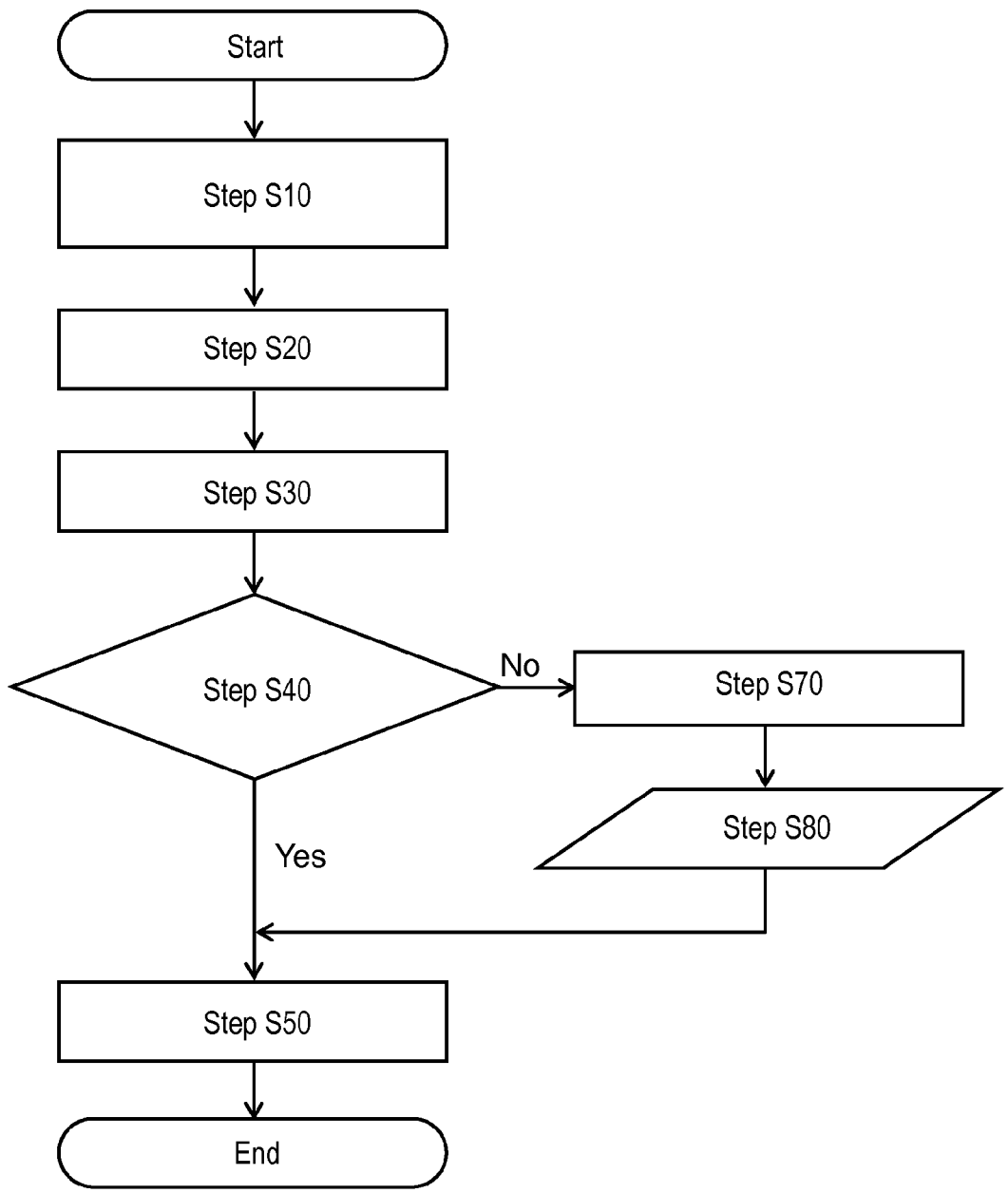
FIG. 10 is a flowchart illustrating an operation for switching the camera in the camera controller device according to the present embodiment.

FIG. 8 is a block diagram illustrating a constitution of the main body part of the camera controller device according to another embodiment of the present technique. FIG. 9 is an explanatory diagram illustrating a schematic constitution of one example of the adjuster in the camera controller device according to the present embodiment. FIG. 10 is a flowchart illustrating an operation for switching the camera in the camera controller device according to the present embodiment. In FIG. 8, FIG. 9, and FIG. 10, the portions having the same functions as those shown in FIG. 5, FIG. 6, and FIG. 7 are denoted by the same reference symbols.

As shown in FIG. 8 and FIG. 9, the camera controller device according to the present embodiment includes notification canceling unit 7 in addition to communication unit 2, switching operation unit 3, adjuster 4, controller 5, and notification unit 6. Notification canceling unit 7 stops the operation of notification unit 6, and makes the setting values of second camera 1B after switching match with the setting values set by adjuster 4 so as to cancel the operation prohibited state of adjuster 4.

As shown in FIG. 10, at step S40, comparison unit 5B compares the received setting values of second camera 1B with the setting values of first camera 1A stored in storage unit 5A, and controller 5 determines whether they match with each other. When they match with each other (Yes), the sequence proceeds to next step S50. When controller 5 operates operation unit 4D of adjuster 4 for the adjustment elements such as the iris adjustment, the pedestal adjustment, the gain adjustment and the flare adjustment, the setting values adjusted by operation unit 4D are transmitted to second camera 1B at step S50.

On the other hand, when they do not match (No), the sequence proceeds to next step S70, notification unit 6 notifies the operator about non-matching. Thereafter, at step S80, when notification canceling unit 7 is operated, controller 5 stops the operation of notification unit 6, and sets the setting values of second camera 1B to setting values at a time point when adjuster 4 operates notification canceling unit 7. As a result, second camera 1B has the same setting values as those set by adjuster 4 of the main body part of the device, and the operation prohibited state where the setting values adjusted by adjuster 4 are not transmitted to second camera 1B is canceled. That is to say, when the operator operates notification canceling unit 7 to cancel the notification state, the setting values of second camera 1B are set to the setting values set by adjuster 4 based on the position of operation unit 4D at the time point when notification canceling unit 7 is operated, and the operation prohibited state set by adjuster 4 is canceled.

In the present embodiment, when the camera is switched, the operator is notified that the setting values of the adjustment elements such as the iris adjustment, the pedestal adjustment, the gain adjustment, and flare adjustment of the camera before switching and the camera after switching do not match with each other. As a result, when the camera is switched, the operator can easily recognize that the setting values of both the cameras are different from each other. Further, the setting values of the camera after switching are set to the setting values adjusted by adjuster 4 by operating notification canceling unit 7, and the operation prohibited state set by adjuster 4 can be canceled.

Figure 11:
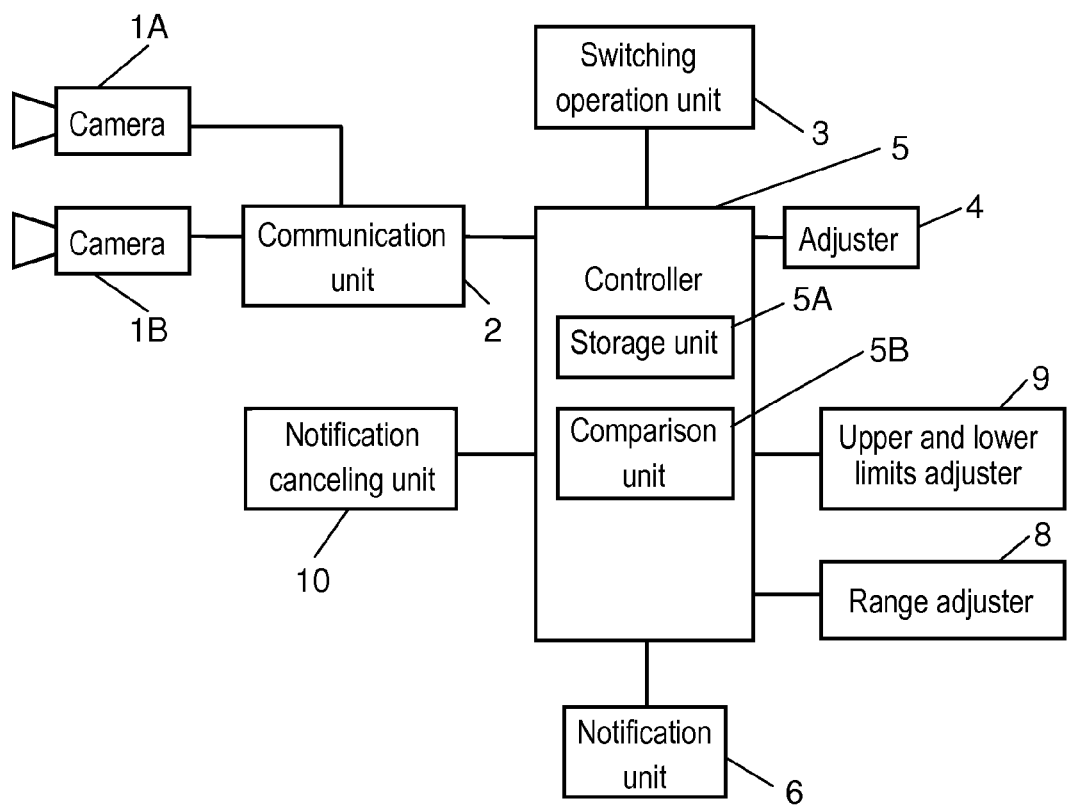
FIG. 11 is a block diagram illustrating a constitution of the main body part of the camera controller device according to another embodiment of the present technique.
Figure 12:
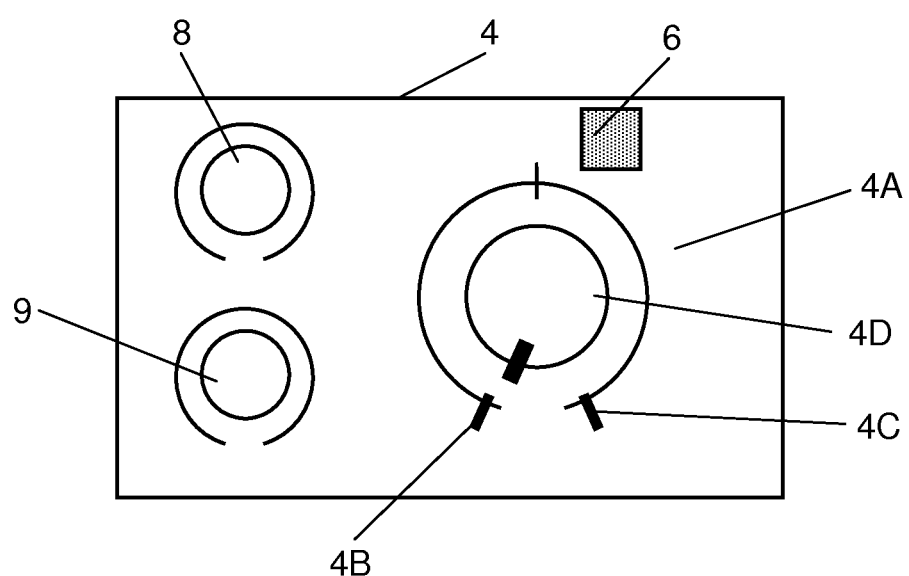
FIG. 12 is an explanatory diagram illustrating a schematic constitution of one example of the adjuster in the camera controller device according to the present embodiment.
Figure 13:
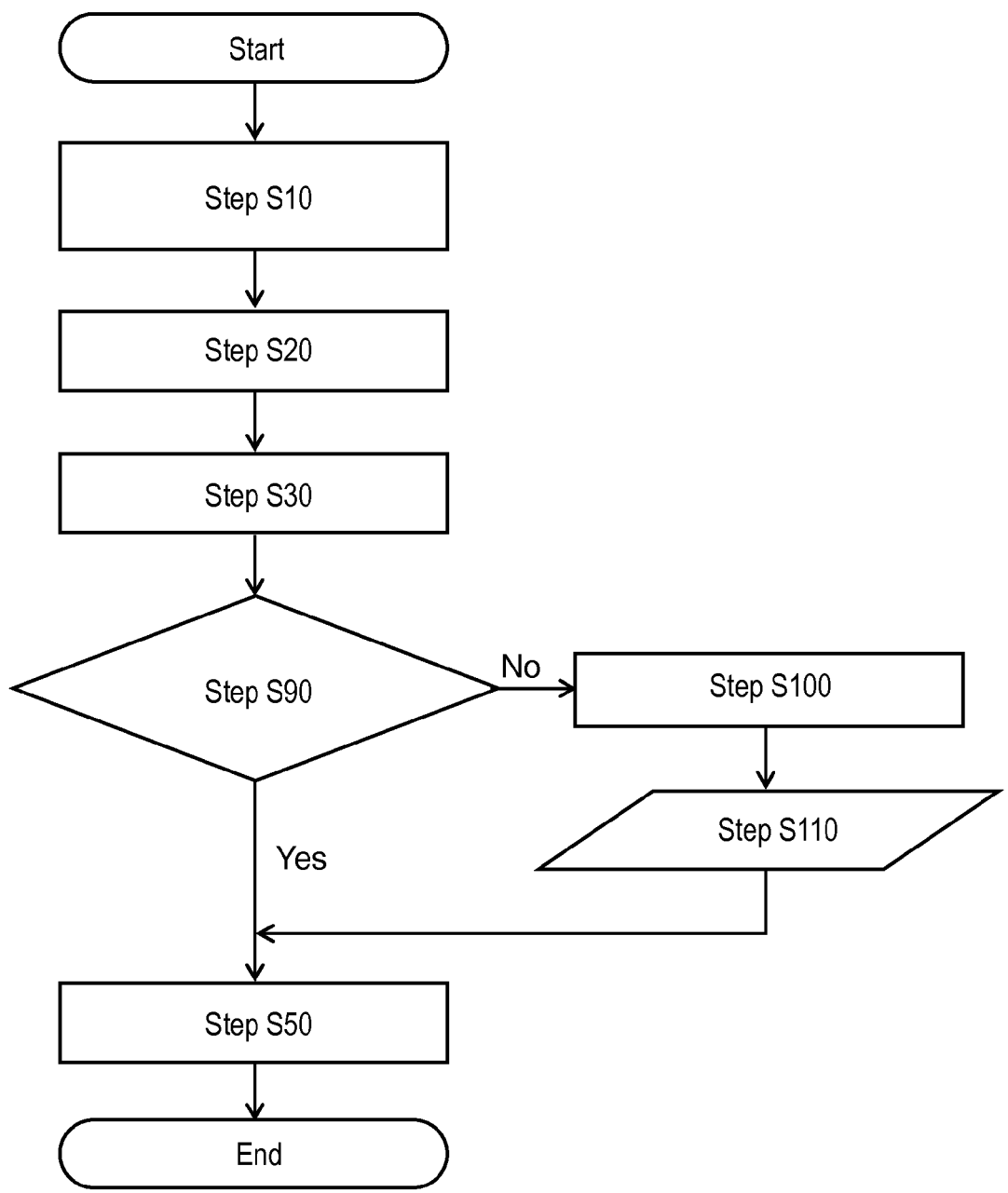
FIG. 13 is a flowchart illustrating an operation for switching the camera in the camera controller device according to the present embodiment.

FIG. 11 is a block diagram illustrating a constitution of the main body part of the camera controller device according to another embodiment of the present technique. FIG. 12 is an explanatory diagram illustrating a schematic constitution of one example of the adjuster in the camera controller device according to the present embodiment. FIG. 13 is a flowchart illustrating an operation for switching the camera in the camera controller device according to the present embodiment. In FIG. 11, FIG. 12, and FIG. 13, the portions having the same functions as those shown in FIG. 8, FIG. 9, and FIG. 10 are denoted by the same reference symbols.

As shown in FIG. 11 and FIG. 12, the camera controller device according to the present embodiment includes range adjuster 8, upper and lower limits adjuster 9 and notification canceling unit 10 in addition to communication unit 2, switching operation unit 3, adjuster 4, controller 5, and notification unit 6. Range adjuster 8 and upper and lower limits adjuster 9 are composed of a slide-type volume or a rotary volume using the variable resistor. Range adjuster 8 sets a width of the adjustment range within a range adjustable by adjuster 4 for the adjustment elements of the camera such as the iris adjustment, the pedestal adjustment, the gain adjustment and the flare adjustment. Upper and lower limits adjuster 9 sets an upper limit position and a lower limit position of the width of the adjustment range set by range adjuster 8. Range adjuster 8 and upper and lower limits adjuster 9 set an operable range of the adjustment elements such as the iris adjustment, the pedestal adjustment, the gain adjustment and the flare adjustment within the range operable by adjuster 4.

As shown in FIG. 13, when the operator operates switching operation unit 3 so as to switch first camera 1A to second camera 1B (step S10), controller 5 switches a control target from first camera 1A to second camera 1B, and transmits the control signal for switching the camera to communication unit 2.

When communication unit 2 requests second camera 1B to transmit the setting values of second camera 1B to the main body part of the device according to the control signal from controller 5, second camera 1B receives the transmission request from the main body part of the device and transmits the setting values of second camera 1B to the main body part of the device at step S20. Communication unit 2 of the main body part of the device receives the setting values of second camera 1B, and retains them in controller 5 at step S30.

At step S90, comparison unit 5B compares the received setting values of second camera 1B with the setting values of first camera 1A stored in storage unit 5A, and controller 5 determines whether they match with each other. When they match with each other (Yes), the sequence proceeds to next step S50. When controller 5 operates operation unit 4D of adjuster 4 for the adjustment elements such as the iris adjustment, the pedestal adjustment, the gain adjustment and the flare adjustment, the setting values adjusted by operation unit 4D are transmitted to second camera 1B at step S50.

On the other hand, when they do not match (No), the sequence proceeds to next step S100, and notification unit 6 notifies the operator about non-matching.

Further, range adjuster 8 and upper and lower limits adjuster 9 limit the operation range of adjuster 4, and when the setting values of second camera 1B are within the operation range limited by range adjuster 8 and upper and lower limits adjuster 9 (Yes), the sequence proceeds to step S50. When the setting values are not within the operation range (No), the sequence proceeds to step S100, and notification unit 6 notifies the operator about the state.

Thereafter, at step S110, controller 5 operates adjuster 4 so as to move the setting values of second camera 1B to an end of the operation range limited by range adjuster 8 and upper and lower limits adjuster 9, and operates notification canceling unit 10 so as to cancel the notification from notification unit 6.

Figure 14:
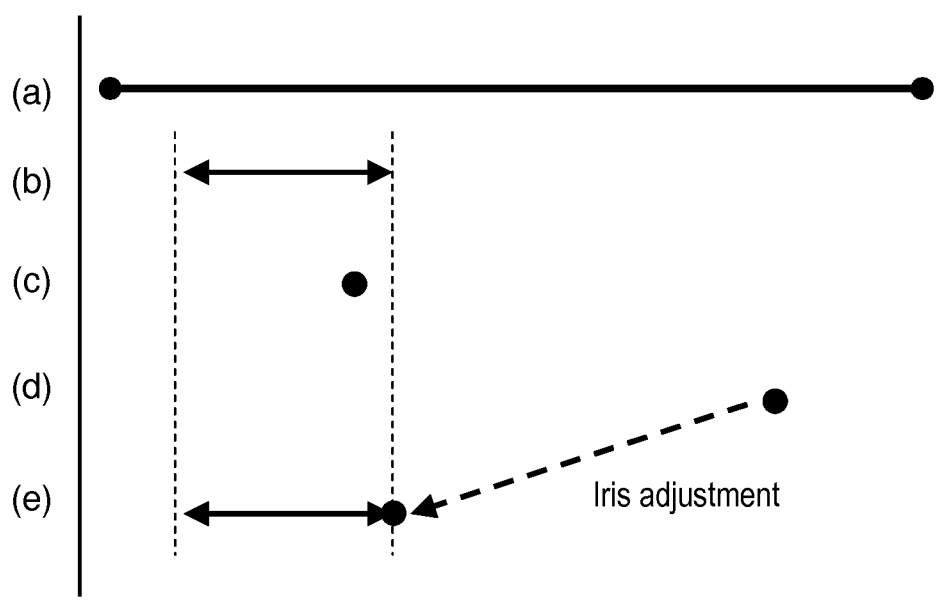
FIG. 14 is an explanatory diagram for describing the operation of the camera controller device according to the embodiment shown in FIG. 11.

A case of the iris adjustment is concretely described as an example with reference to FIG. 14. FIG. 14 is an explanatory diagram for describing the operation of the camera controller device according to the embodiment shown in FIG. 11. In FIG. 14, for example, the width where the iris adjustment can be made by adjuster 4 is a range shown in FIG. 14(a). Range adjuster 8 and upper and lower limits adjuster 9 set the width and the upper limit and lower limit positions of the adjustment value within a range shown in FIG. 14(b).

First, when first camera 1A is switched to second camera 1B with the iris value of first camera 1A being in the position within the range shown in FIG. 14(b) indicated by a black circle in FIG. 14(c), the iris value is in the position indicated by a black circle in FIG. 14(d) out of the operable range shown in FIG. 14(b), and thus the iris adjustment cannot be carried out.

Therefore, an function as the notification canceling unit is provided to end positions (upper end and lower end) of adjuster 4 where iris adjustment is carried out, and a correction is made by the operation of adjuster 4 after switching, as shown by a dotted line in FIG. 14, so that the position of the black circle in FIG. 14(d) is changed to the position of the black circle in FIG. 14(e). In such a manner, the notification by notification unit 6 is canceled. FIG. 14(e) illustrates that the iris value of second camera 1B is corrected to the end of the range where adjuster 4 can carry out the iris adjustment. The notification canceling operation is performed when adjuster 4 reaches the start point and the end point.

In the present embodiment, even when the setting values are out of the setting range after the switching of the camera, the operation can be performed according to operator's intentions. In the flowchart shown in FIG. 13, step S40, step S70, and step S80 shown in FIG. 10 are omitted. Also in the present embodiment, it is preferable that step S40, step S70, and step S80 are provided between step S30 and step S90.

The present technique is useful for the controller device that can control with switching of the plurality of cameras, and can be applied to studio camera systems.

The embodiment is described above as the example of the present technique. For this reason, the accompanying drawings and the detailed description are given.

Therefore, the components described in the accompanying drawings and the detailed description include not only the components essential for solving the problem but also components that are not essential for solving the problem for exemplification of the above-described technique. For this reason, even if these unessential components are described in the accompanying drawings and the detailed description, the unessential components should not be immediately specified as being essential.

Further, since the above embodiment is for illustrating the technique of the present technique, various modifications, replacements, additions and omissions can be carried out within the scope of claims or its equivalent scope.

What is claimed is:

1. A camera controller device for controlling a plurality of cameras including a first camera and a second camera, the camera control device comprising:
   a switch for switching a camera control from the first camera to the second camera;
   an adjuster for adjusting an adjustment element of a camera, among the plurality of cameras, which is being controlled by the camera control, with a setting value; and
   a controller for controlling the camera controller device, and
   wherein the controller compares a first setting value of the adjustment element of the first camera with a second setting value of the adjustment element of the second camera, and when both the first and second setting values do not match with each other, the controller keeps the adjuster to be an operation prohibited state until the second setting value of the adjustment element of the second camera and a setting value set by the adjuster match with each other.

2. The camera controller device according to claim 1, wherein the controller includes a storage for storing setting values of the adjustment elements of the plurality of cameras adjusted by the adjuster, and a comparator for comparing the setting values of the adjustment elements of the plurality of cameras.

3. The camera controller device according to claim 1, wherein the controller includes a notification device for notifying an operator about non-matching when the first setting value of the adjustment element of the first camera does not match with the second setting value of the adjustment element of the second camera.

4. The camera controller device according to claim 1, wherein the controller includes a notification device for notifying an operator about non-matching when the first setting value of the adjustment element of the first camera does not match with the second setting value of the adjustment element of the second camera, and a notification canceling device for stopping an operation of the notification device and for adjusting the second setting value of the adjustment element of the second camera match with the setting value set by the adjuster so as to cancel the operation prohibited state of the adjuster.

5. A camera controller device for controlling a plurality of cameras including a first camera and a second camera, the camera control device comprising:
   a switch for switching a camera control from the first camera to the second camera;
   an adjuster for adjusting an adjustment element of a camera, among the plurality of cameras, which is being controlled by the camera control, with a setting value, the adjuster having a start point and an end point of an adjustment range;
   a controller for controlling the camera controller device;
   a range adjuster for setting a width of the adjustment range for the plurality of cameras within an operable range of the adjuster; and
   an upper and lower limits adjuster for setting upper limit and lower limit positions of the width of the adjustment range set by the range adjuster,
   wherein the controller compares a first setting value of the adjustment element of the first camera with a second setting value of the adjustment element of the second camera, and when both the first and second setting values do not match with each other, the controller keeps the adjuster an operation prohibited state until the second setting value of the adjustment element of the second camera and the setting value set by the adjuster match with each other, and
   wherein when the second setting value of the adjustment element of the second camera is not within an operation range limited by the range adjuster and the upper and lower limits adjuster, a notification device notifies that the second setting value is not within the operation range.

* * * * *